(12) United States Patent
Chien et al.

(10) Patent No.: US 6,485,217 B2
(45) Date of Patent: Nov. 26, 2002

(54) LIGHT ADJUSTMENT DEVICE FOR LASER RESONANT SOCKET

(75) Inventors: Teng-Yuan Chien, Keelung; Chao-Chi Huang, Taipei; Wan-Rone Liou, Tainan, all of (TW)

(73) Assignee: Quarton, Inc. (TW)

( * ) Notice: Subject to any disclaimer, the term of this patent is extended or adjusted under 35 U.S.C. 154(b) by 73 days.

(21) Appl. No.: 09/759,810

(22) Filed: Jan. 11, 2001

(65) Prior Publication Data

US 2002/0090254 A1 Jul. 11, 2002

(30) Foreign Application Priority Data

Oct. 17, 2000 (TW) .......................... 089217942

(51) Int. Cl.[7] ............................ F21V 21/14; F16C 11/00
(52) U.S. Cl. .................. 403/122; 403/141; 362/421
(58) Field of Search .................. 403/122, 124, 403/129, 141, 142, 143; 362/285, 287, 421, 427, 581, 372

(56) References Cited

U.S. PATENT DOCUMENTS

| | | | | |
|---|---|---|---|---|
| 1,739,641 A | * | 12/1929 | Lessmann | 362/427 |
| 4,445,163 A | * | 4/1984 | Ziaylek, Jr. | 362/287 |
| 5,784,823 A | * | 7/1998 | Chen | 42/103 |
| 6,039,461 A | * | 3/2000 | Cummings et al. | 362/287 |
| 6,315,432 B1 | * | 11/2001 | Kuo | 362/287 |
| 6,371,628 B1 | * | 4/2002 | Ward | 362/287 |

* cited by examiner

Primary Examiner—Lynne H. Browne
Assistant Examiner—Kenn Thompson
(74) Attorney, Agent, or Firm—Raymond Sun

(57) ABSTRACT

A light adjustment device for a laser resonant socket having a laser base having a housing that defines a laser chamber that retains a laser diode therein, and a fixing seat disposed at one end of the housing. The light adjustment device further includes an upper cover that is removably coupled with the fixing seat to define a spherical groove, and an adjuster body having a ball and an adjusting shaft, with a resonant socket room defined in the ball, and with a laser resonant socket retained inside the socket room. The ball is seated inside the spherical groove in a manner such that the ball can be pivoted inside the spherical groove to adjust the orientation of the ball and the adjusting shaft with respect to the laser base.

12 Claims, 3 Drawing Sheets

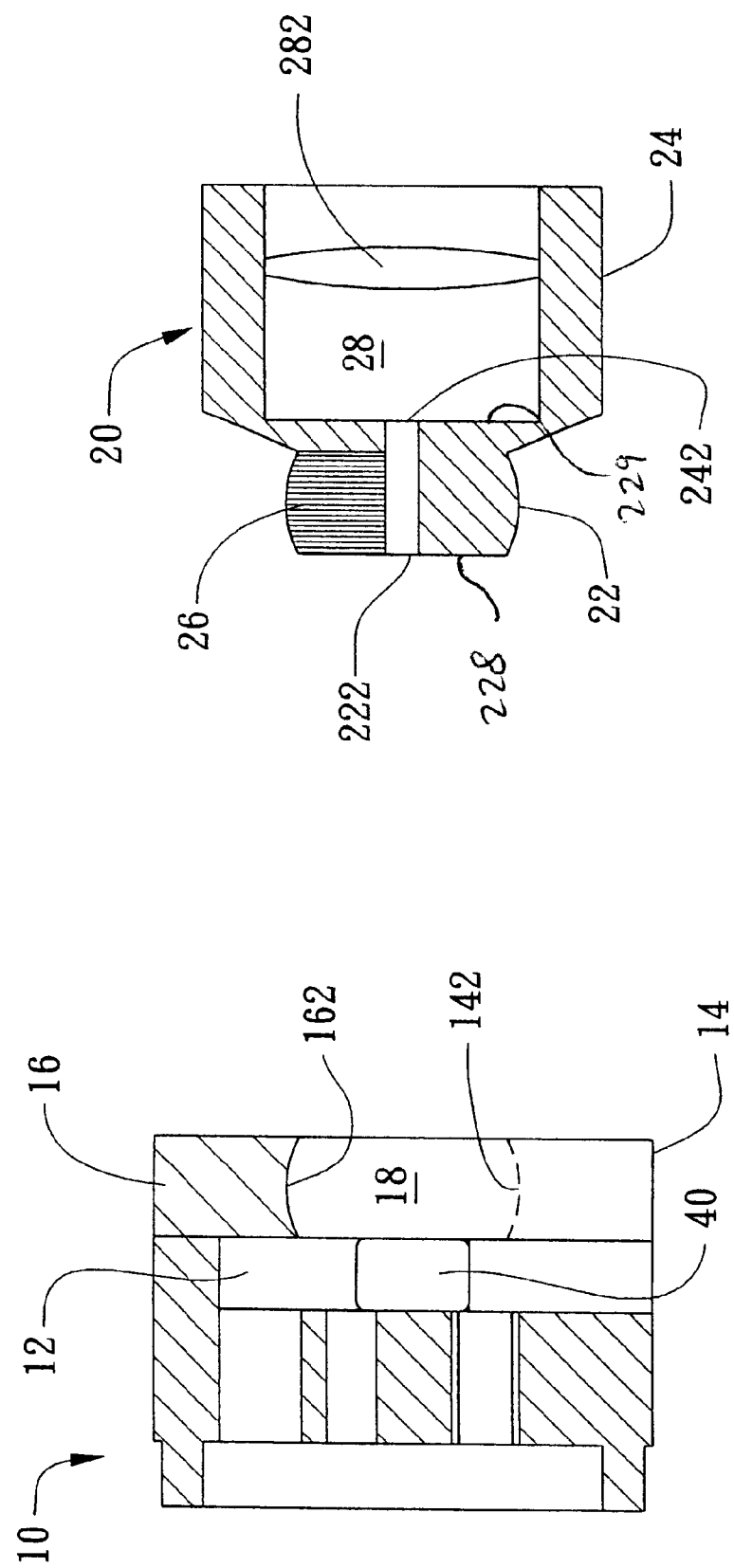

LIGHT ADJUSTMENT DEVICE FOR LASER RESONANT SOCKET

BACKGROUND OF THE INVENTION

1. Field of the Invention

The present invention relates to a light adjustment device for a laser resonant socket.

2. Description of the Prior Art

Recently, the advancements in the photoelectron industry and the improvements in semiconductor manufacturing processes have resulted in increased use of laser diode products. Since the manufacture of laser diodes at certain frequencies is rather difficult and the cost is rather high, a red laser diode is normally used as the solid laser of a pump light source to operate in coordination with the nonlinear function of multiple frequency chips to generate the laser beams according to the desired frequencies. However, such micro resonant socket laser systems structured by the gain media and multiple frequencies need to have their beam emissions adjusted first before a preferred output power can be obtained.

The light adjustment used by the prior art is to first place a laser diode and a laser resonant socket along the same plane, and then to use a sharp object to move the laser resonant socket about so as to adjust the laser beam's projection point and angle on the light entering face of the resonant socket to obtain the optimum output power. After the adjustment has been completed, glue is used to fix the desired location of the laser diode and the laser resonant socket.

However, the accuracy of such an adjustment method is quite limited because the range of the adjustment is limited to horizontal rotation and movement, and cannot adjust perpendicular angles and or utilize axial rotation. Consequently, this inability to accurately adjust the relative positions of the laser diode and the laser resonant socket means that the emitted laser beam cannot be optimized, thereby leading to a drop in the efficiency of the whole laser system. In addition, the heat yielded in the laser resonant socket during use usually leads to the uneven expansion of the elements of the resonant socket, causing laser light dot deflection. Since the exit point of the laser beam deviates from its optimum position, the output power will drop, so that the glue used to attach the laser diode and the laser resonant socket will be compromised, possibly causing the resonant socket to become loose and to even fall off.

SUMMARY OF THE INVENTION

It is an object of the present invention to provide a light adjustment device for a laser resonant socket.

It is another object of the present invention to provide a light adjustment device for a laser resonant socket that facilitates adjustment in all directions to obtain the optimum output power.

It is yet another object of the present invention to provide a light adjustment device for a laser resonant socket that is effective in quickly conducting away the heat from the resonant socket.

The objectives of the present invention can be accomplished by providing a light adjustment device for a laser resonant docket, the light adjustment device having a laser base having a housing that defines a laser chamber that retains a laser diode therein, and a fixing seat disposed at one end of the housing. The light adjustment device further includes an upper cover that is removably coupled with the fixing seat to define a spherical groove, and an adjuster body having a ball and an adjusting shaft, with a resonant socket room defined in the ball, and with a laser resonant socket retained inside the socket room. The ball is seated inside the spherical groove in a manner such that the ball can be pivoted inside the spherical groove to adjust the orientation of the ball and the adjusting shaft with respect to the laser base, so as to obtain a properly aligned laser beam.

BRIEF DESCRIPTION OF THE DRAWINGS

FIG. 2 is a cross-sectional view of a laser base of the light adjustment device shown in FIG. 1;

FIG. 3 is a cross-sectional view of an adjuster body of the light adjustment device shown in FIG. 1.

DETAILED DESCRIPTION OF THE PREFERRED EMBODIMENT

Figure 1:
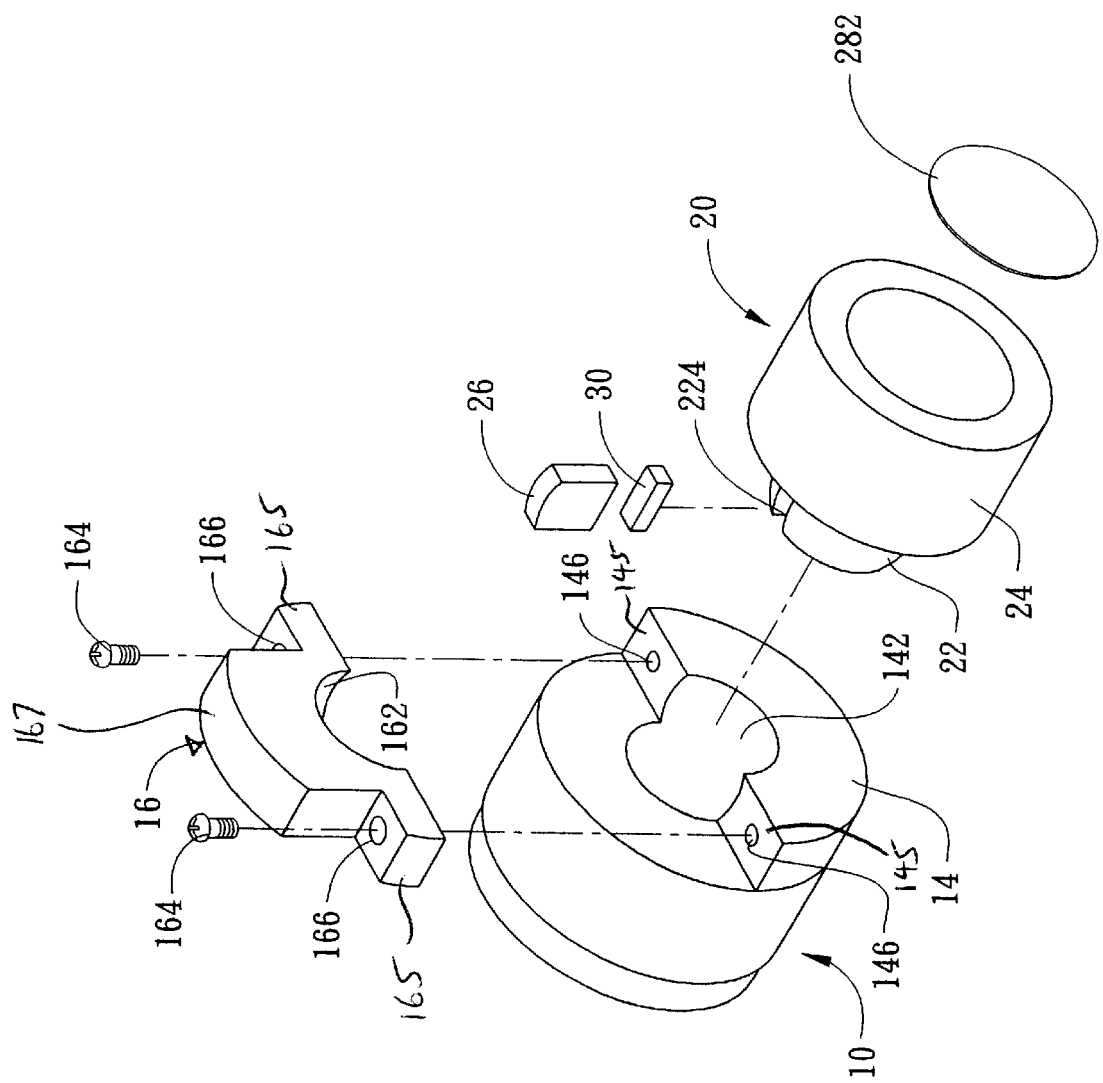
FIG. 1 is an exploded perspective view of a light adjustment device according to one embodiment of the present invention.

Referring to FIGS. 1, 2 and 3, a light adjustment device for a laser resonant socket according to the present invention includes a laser base 10, a fixing upper cover 16, and an adjuster body 20. A laser chamber 12 is disposed inside the laser base 10 for a laser diode 40 to be secured therein. A fixing seat 14 is provided at a front end of the laser base 10, and is configured as a semi-circular segment having two sectional faces 145, each having a threaded hole 146, respectively. The inner surface of the fixing seat 14 is formed to define a semi-spherical groove 142.

The fixing upper cover 16 is also a semi-circular segment and is adapted to be connected to the fixing seat 14 of the laser base 10 to form a generally cylindrical construction. The upper cover 16 has two opposing outer flanges 165 extending from an arched central piece 167, with a fixing hole 166 provided at each outer flange 165. Each fixing hole 166 is aligned with a corresponding threaded hole 146 so that a threaded bolt 164 can be inserted through each fixing hole 166 and corresponding threaded hole 146 to secure the upper cover 16 to the fixing seat 14. A semi-spherical groove 162 is also defined at the inner circular surface of the arched central piece 167 so as to form a generally spherical fixing room 18 when the fixing upper cover 16 is combined with the fixing seat 14 to form a generally spherical fixing room 18.

The adjuster body 20 has a resonant socket-fixing ball 22 and an adjusting shaft 24. The resonant socket-fixing ball 22 is formed by cutting out two planar portions at two opposite sides of a sphere to form two generally planar and opposing sectional faces 228 and 229. A resonant socket room 222 is formed inside the ball 22, and is configured like a bore with an opening at each side thereof that is positioned at the center of each sectional face 228, 229 of the ball 22. A laser resonant socket 30 is adapted to be retained inside the socket room 222. The adjusting shaft 24 is hollow, having one end connected to one sectional face 229 of the resonant socket-fixing ball 22, with the opening of the socket room 222 at the sectional face 229 defining a light exit 242 so that laser beams emitted from the resonant socket 30 can pass through the hollow section of the adjuster shaft 24. To assemble the present invention, the adjuster body 20 is provided with the laser resonant socket 30 disposed inside the socket room 222, and the ball 22 is fitted inside the semi-spherical groove 142 of the fixing seat 14. The shaft 24 is then pivoted in any desired direction (i.e., up, down, left, right, rotate at any angle or extent) to adjust the relative position between the adjuster body 20 and the laser base 10 to achieve the highest or optimum output power position for the laser resonant socket 30. When the desired position has been found, the upper cover 16 can be secured to the fixing seat 14 by tightening the bolts 164.

In addition, a slot 224 may further be disposed in the resonant socket-fixing ball 22. The slot 224 can be cut from the outer surface of the ball 22 through to the resonant socket room 222 so as to make the installation of the laser resonant socket 30 easier. For the sake of filling in the cavity caused by the slot 224 and for strengthening and fixing the laser resonant socket 30, a resonant socket-fixing sheet 26 can be inserted into the slot 224 to tightly press and fix the laser resonant socket 30 so as to prevent the laser resonant socket 30 from receiving uneven heat expansion and output power drop owing to any deviation of the light point. In addition, because the resonant socket-fixing ball 22 is made of a metal material, it enjoys good heat conduction and can dissipate the heat generated from the laser resonant socket 30 to the outer surface of the ball 22 and then to the atmosphere. Moreover, the hollow section of the adjusting shaft 24 can be used as a lens room 28 for installing a lens set 282 that functions to center any emitted laser beam.

Figure 4:
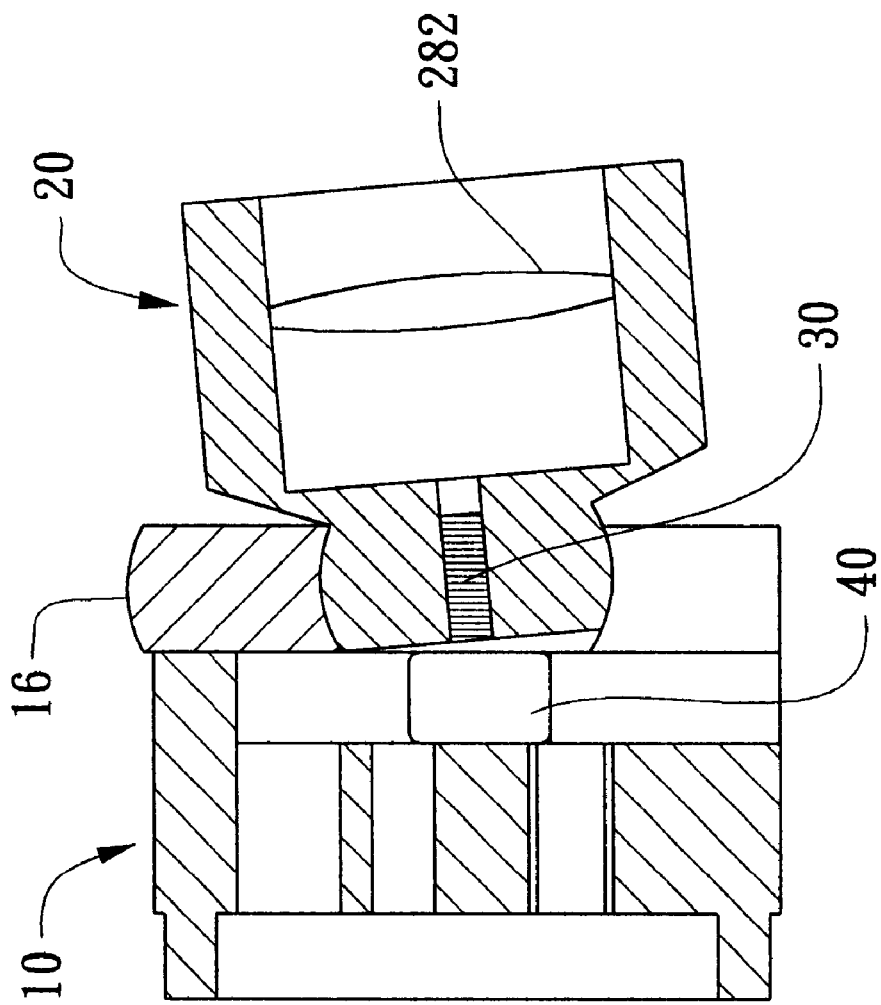
FIG. 4 is a cross-sectional view of the light adjustment device shown in FIG. 1, illustrating the operation of the device.

FIG. 4 is a cross-sectional view for illustrating the operation of the light adjustment device of the present invention. When the adjuster body 20 having the laser resonant socket 30 therein is connected with the laser base 10, the user can adjust and rotate the adjuster body 20 to any angle or orientation to allow the relative position of the laser resonant socket 30 and the laser diode 40 to be such as to promote the optimum output power. The upper cover 16 can then be used to lock the adjuster body 20 tightly, and the laser beam can be adjusted to its center point to for emission through the lens set 282 in the adjusting shaft 24.

As a result, the spherical structure of the resonant socket fixing ball 22 and the fixing function of a laser base 10 and an upper fixing cover 16 facilitates multi-directional adjustment, enabling the resonant socket 30 to obtain the highest or optimum output power possible.

What is claimed is:

1. A light adjustment device for a laser resonant socket, comprising:
    a laser base having a housing that defines a laser chamber that retains a laser diode therein, and a fixing seat disposed at one end of the housing;
    an upper cover that is removably coupled with the fixing seat to define a spherical groove; and
    an adjuster body, having a ball and an adjusting shaft, wherein a resonant socket room is defined in the ball, with a laser resonant socket retained inside the socket room;
    wherein the ball is seated inside the spherical groove in a manner such that the ball can be pivoted inside the spherical groove to adjust the orientation of the ball and the adjusting shaft with respect to the laser base.

2. The device of claim 1, wherein the ball of the adjuster body is formed by cutting two opposing planar portions thereof, and has two openings, one opening at each of the planar portions of the ball for accessing the socket room.

3. The device of claim 2, wherein the adjusting shaft has a hollow section and is connected to one of the two planar portions so as to allow a laser beam emitted from the laser resonant socket to project through the hollow section thereof.

4. The device of claim 2, wherein a slot is disposed in the ball, the slot being cut from an outer surface of the ball through to the resonant socket room, and further including a resonant socket-fixing sheet that is inserted into the slot to fix the position of the laser resonant socket.

5. The device of claim 3, further including a lens set positioned inside the hollow section of the adjuster shaft.

6. The device of claim 1, wherein a slot is disposed in the ball, the slot being cut from an outer surface of the ball through to the resonant socket room, and further including a resonant socket-fixing sheet that is inserted into the slot to fix the position of the laser resonant socket.

7. The device of claim 1, wherein the upper cover is coupled to the fixing seat of the laser base by bolts.

8. The device of claim 1, wherein the fixing seat of the laser base defines a semi-spherical groove.

9. The device of claim 8, wherein the upper cover defines a semi-spherical groove.

10. A method of adjusting a laser resonant socket, comprising:
    providing a laser base having a housing that defines a laser chamber that retains a laser diode therein, and a fixing seat disposed at one end of the housing;
    providing an adjuster body having a ball and an adjusting shaft, the ball defining a resonant socket room therein;
    positioning a laser resonant socket into the resonant socket room;
    placing the ball on the fixing seat and pivoting the ball until a desired orientation is reached; and
    placing an upper cover over the ball and the fixing seat, and securing the upper cover to the fixing seat.

11. The method of claim 10, wherein the fixing seat defines a semi-spherical groove on which the ball is received and pivoted.

12. The method of claim 11, wherein the upper cover defines a semi-spherical groove which combines with the semi-spherical groove of the fixing seat to form a spherical groove inside which the ball is retained.

* * * * *